United States Patent [19]

Sakano

[11] Patent Number: 4,827,203
[45] Date of Patent: May 2, 1989

[54] ROTOR ROTATIONAL POSITION DETECTOR FOR A MOTOR

[75] Inventor: Tetsuro Sakano, Yamanashi, Japan

[73] Assignee: Fanuc Ltd, Minamitsuru, Japan

[21] Appl. No.: 131,046

[22] PCT Filed: Mar. 14, 1987

[86] PCT No.: PCT/JP87/00161
§ 371 Date: Nov. 4, 1987
§ 102(e) Date: Nov. 4, 1987

[87] PCT Pub. No.: WO87/05755
PCT Pub. Date: Sep. 24, 1987

[30] Foreign Application Priority Data

Mar. 14, 1986 [JP] Japan .................................. 61-55059

[51] Int. Cl.⁴ .............................................. G05B 1/06
[52] U.S. Cl. .................................... 318/667; 318/601; 318/602
[58] Field of Search ....................... 318/661, 601, 602

[56] References Cited

U.S. PATENT DOCUMENTS 4,507,590 3/1985 Miyazaki .......................... 318/254

Primary Examiner—Vit W. Miska
Assistant Examiner—Saul M. Bergmann
Attorney, Agent, or Firm—Staas & Halsey

[57] ABSTRACT

A rotor rotational position detector for a motor is provided which is capable of detecting an absolute rotation position of a rotor shaft of the motor for one revolution of the rotor shaft. The detector also detects, simultaneously with the absolute detection, a rotor magnetic pole rotational position for motor driving control.

The absolute rotational position of the rotor shaft in one revolution of the rotor shaft is detected and a coded signal (a), representative of the detected position, is output. The coded signal (a) is converted into a rotor magnetic position signal (b) for motor driving control by a code converting circuit (5), and is outputted therefrom.

11 Claims, 2 Drawing Sheets

ROTOR ROTATIONAL POSITION DETECTOR FOR A MOTOR

FIELD OF THE INVENTION

The present invention relates to a detector for detecting the rotational position of a rotor of a motor, and more particularly to a rotational position detector capable of detecting the absolute rotational position of a rotor shaft of a motor, and at the same time detecting the magnetic pole position of the rotor controlling the motor drive.

BACKGROUND ART

To drive an AC servo motor or a stepping motor, it is necessary to control an electric current passing through the stator of the motor in accordance with the rotational position of a predetermined magnetic pole of the rotor (hereinafter referred to as "the magnetic pole position") relative to the stator of the motor. In this connection, a detector is required, which is capable of detecting the magnetic pole position of the rotor to generate a signal representative of the detected magnetic pole position of the rotor. Conventionally, the detection of magnetic pole position of the rotor has been carried out by:

(1) using a synchro or resolver which has poles equal in number to that of the rotor;

(2) using a detector, which is constructed to detect the absolute position of the rotor at intervals of a period equal to a value calculated by dividing a rotational period of a motor by a number of poles of the rotor or half the number of the rotor poles so that a detected absolute data indicates the magnetic pole position of the rotor; and (3) using a position detector which is coupled to the rotor of a motor by way of gears or the like so as to rotate a number of revolutions equal to a number of rotor poles or half the number of the rotor poles per one revolution of the motor to output an absolute detection data in one revolution of the detector as a rotor magnetic pole position data.

However, none of the above-mentioned conventional methods can carry out absolute detection for one revolution of a motor, so that they require another detector to effect this kind of absolute detection. Moreover, to detect a rotor magnetic pole position, these methods use a detector constructed in conformity with a number of rotor poles. That is, they have to use different detectors for motors which have a different number of poles, resulting in the necessity of preparing many kinds of detectors for the magnetic pole position detection. Accordingly, problems such as increased complexity in both designing and manufacturing occur. Furthermore, in the above-mentioned method (3) using gears, abration of the gears and backlash can occur, which adversely affects detection accuracy.

SUMMARY OF THE INVENTION

It is an object of the present invention to provide a rotational position detector which is capable of carrying out absolute detection for one revolution of a motor, and is adaptable to a variety of motors having different numbers of rotor poles, requiring only minor modification of electrical parts.

To achieve the above-mentioned object, in a first embodiment, the present invention comprises an absolute type position detector coupled to a rotor shaft of a motor for detecting an absolute position of the rotor shaft in one revolution of the rotor shaft, and for outputting a coded signal indicative of the detected position. A code converting means for converting the coded signal from the absolute type position detector into a coded rotor magnetic pole position signal for controlling of the motor drive, and for the outputting same, is also provided.

According to a second embodiment, the present invention comprises a position detector coupled to a rotor shaft of a motor for outputting a coded signal representative of an absolute position of the rotor shaft in one revolution of the rotor shaft and for sequentially outputting increment pulses corresponding to the revolution of the rotor shaft. A code converting means for converting the coded signal from the position detector into a second coded signal representative of a rotor magnetic pole position for controlling the motor drive, and for outputting the second coded signal is provided. A counter is arranged to be reset to a predetermined value every time the counter counts pulses which equal the increment pulses generated during one cycle of the magnetic pole position detector. When a power supply is turned on, an output from the code converting means is set in the counter as an intitial value. The counter is operable to count the incremental pulses from the position detector and output the counted value as a third coded signal representative of a rotor magnetic pole position for controlling the motor drive.

As described above, according to the present invention, since the coded output from the absolute type position detector for detecting the rotor shaft position is converted into the signal representative of the rotor magnetic pole position by the code converting means, the absolute position of the rotor shaft and the rotor synchronization data for motor drive control can be obtained by employing only a single position detector. Further, the detector of the present invention is adaptable to a variety of motors which have different numbers of rotor poles, by solely exchanging an electrical circuit such as the code converting means. Therefore, in case, for instance, that a robot or the like is driven by a motor in a direct drive system, the absolute position of the rotor shaft required for a motor direct drive system can be detected, and at the same time the rotor synchronization data for controlling motor drive can be obtained.

DESCRIPTION OF THE PREFERRED EMBODIMENTS

Figure 1A:
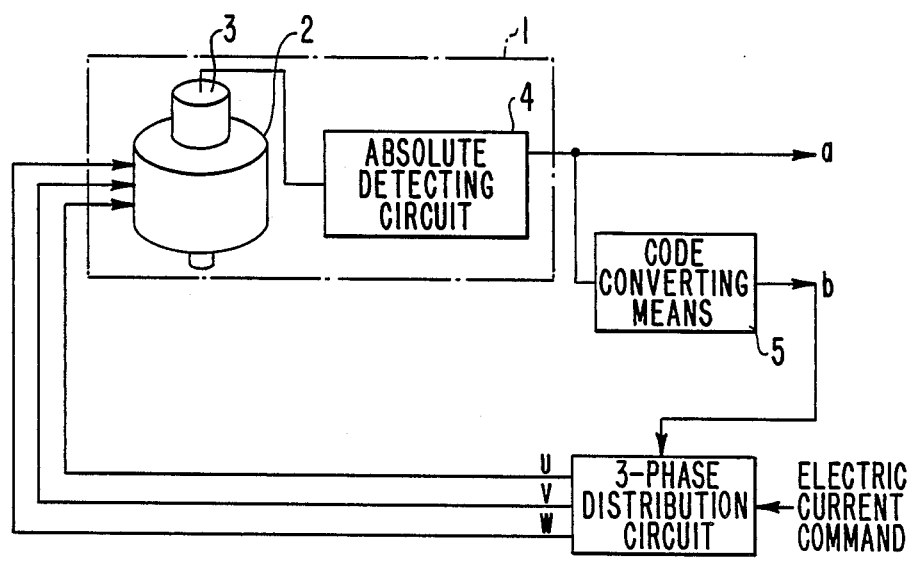
FIG. 1A is a block diagram of a position detector according to a first embodiment of the present invention in which an AC motor is employed.
Figure 1B:
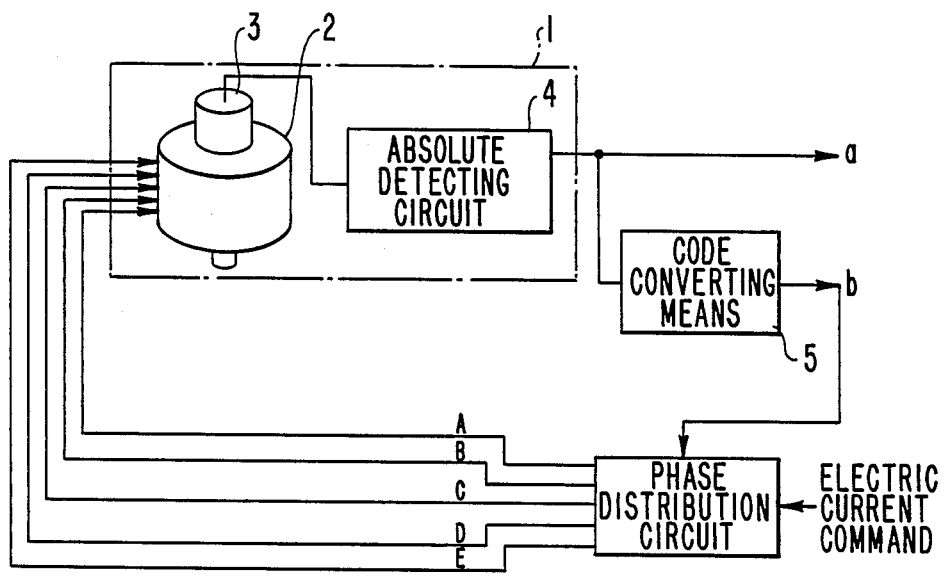
FIG. 1B is a block diagram of a position detector according to the first embodiment in which a stepping motor is employed.

FIG. 1 is a rotational position detector according to a first embodiment of the present invention. Reference numeral 1 designates a conventionally known absolute type position detector which may be any type such as an optical or magnetic type detector. The absolute type position detector 1 comprises a detecting section 2 and a rotor shaft 3 which is secured to a rotor shaft (not shown) of an AC servo motor or a stepping motor. The rotor shaft 3 has a code disk secured thereto on which absolute codes are formed. The detector 1 is so arranged that the detecting section 2 optically or magnetically reads absolute codes formed on the code disk when the rotor shaft 3 of the detector 1 is rotated and consequently the code disk is rotated along with rotation of the rotor shaft of a motor (not shown). As absolute detecting circuit 4 responds to the output from the detecting section 2 and sequentially outputs data representative of a position of the rotor shaft of the motor, that is, absolute data a is input.

Further, the detector 1 has a code converting means 5 connected thereto which is supplied with the absolute data a output from the absolute detecting circuit 4. The code converting means 5 is arranged to convert the absolute data a into a signal for providing motor driving control, that is, data b is output for synchronizing the rotor of the motor, as will be described later.

In AC servo motors and stepping motors, a driving current must be controlled corresponding to a relative position of the rotor magnetic pole and the stator winding, whereas the relative position of the magnetic pole and the winding is determined in accordance with the number of the rotor poles. Therefore, the code conversion from the absolute data a into data b for rotor synchronization is carried out in consideration of the number of the rotor poles. For code conversion, a code-converting method using a logical circuit and a code-converting method using a read only memory (ROM) can be employed. Hereinafter, an example of using the ROM as the code converting means 5 will be explained.

In the present embodiment, the absolute type position detector 1 is arranged to output a code representative of the rotational position of the rotor shaft every 1/30 revolution of the rotor shaft of the motor, and to obtain 30 absolute data, for example, coded data "0" to "29", per one revolution of the rotor shaft. For effecting a desired control of the motor driving current, the rotor synchronization data b is generated at intervals of a period calculated by multiplying the rotational period of the rotor shaft by 1/(number of pole pairs). For example, if the number of rotor poles of the motor is assumed to be six, the rotor synchronization data b for three cycles are generated per one revolution of the rotor shaft. As described above, since 30 absolute data a are generated per one revolution of the rotor shaft, ten data a are generated in one motor control cycle corresponding to ⅓ revolution of the rotor shaft. Then, the data a are converted into coded data, respectively, as will be hereinafter referred to, and ten data b, respectively coded by "0" to "9" and indicating the rotor pole position in each motor control cycle, are obtained.

More specifically, in addresses "0" to "9" of the ROM employed as the code converting means 5, there are stored the codes "0" to "9". In addresses "10" to "19" there are again stored the codes "0" to "9", and in addresses "20" to "29" there are further stored the codes "0" to "9", respectively. When the rotor shaft 3 of the position detector 1 is rotated along with the motor, the detecting section 2 detects the absolute codes which are formed on the disk secured to the rotor shaft 3. Then, the absolute detecting circuit 4 supplies one of the coded absolute data consisting of "0" to "29" into the ROM in response to the output from the detecting section 2. As a result, the absolute data, that is, the address of the ROM corresponding to the rotational position of the rotor shaft 3, is selected, and one of the rotor synchronization codes consisting of "0" to "9" is read out from the address and output as a signal for driving the motor. Incidentally, the absolute data from the detecting circuit 4 is provided for control other than motor driving control.

The relationship between the absolute data a and the synchronization data b is as follows:

| ABSOLUTE CODE | SYNCHRONIZATION CODE |
| --- | --- |
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 0 |
| 11 | 1 |
| 12 | 2 |
| 13 | 3 |
| 14 | 4 |
| 15 | 5 |
| 16 | 6 |
| 17 | 7 |
| 18 | 8 |
| 19 | 9 |
| 20 | 0 |
| 21 | 1 |
| 22 | 2 |
| 23 | 3 |
| 24 | 4 |
| 25 | 5 |
| 26 | 6 |
| 27 | 7 |
| 28 | 8 |
| 29 | 9 |

As described above, an example is given wherein a ROM is used as the code converting means 5. When the code converting means 5 is formed of a logical circuit or an arithmetic circuit, the same code conversion as described above can be applied. As a result, the absolute position of the rotor shaft of the motor can be detected by the absolute data a, and the data b for rotor synchronization can be obtained by the code converting circuit 5.

Figure 2:
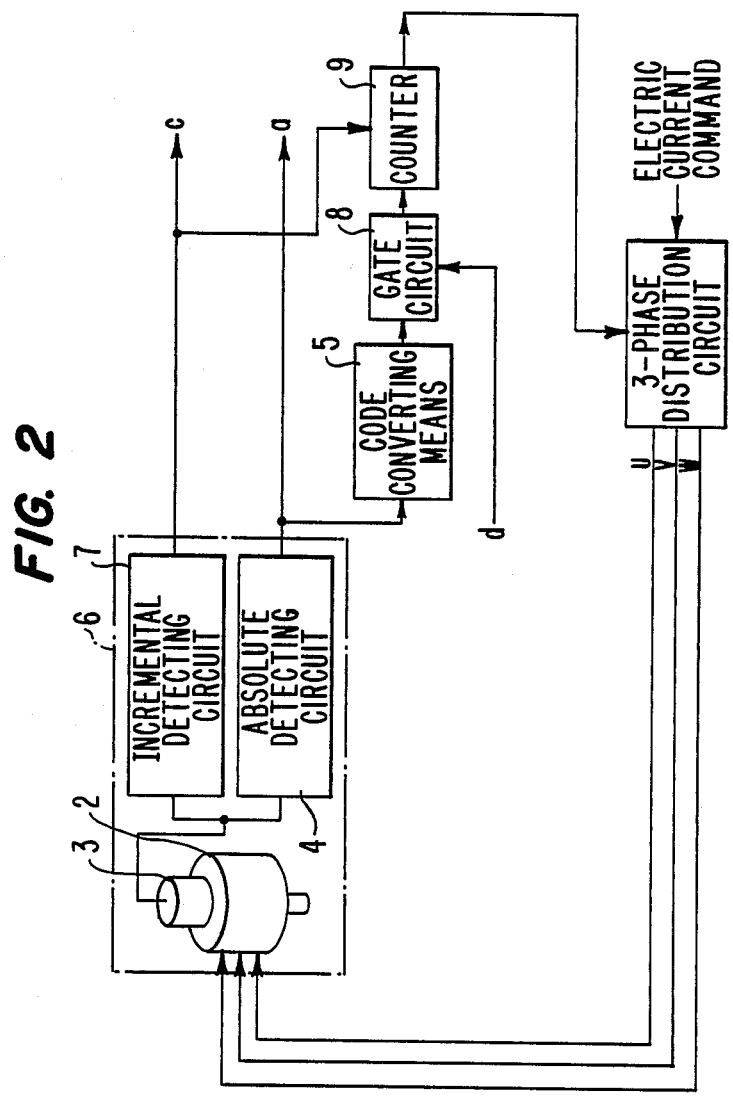
FIG. 2 is a block diagram of a position detector according to a second embodiment of the present invention.

FIG. 2 is a second embodiment of the present invention wherein, as distinct from the first embodiment, includes a position detector 6 including an incremental detecting circuit 7 for detecting a travelling amount of the rotor shaft of the motor. The position detector 6 is used in place of the position detector 1 so as to enable the output of an incremental detected pulse c and obtaining highly reliable data for synchronizing the rotor by the use of the detected pulse. The same remaining elements are the elements as those employed in the first embodiment and are designated by the same reference numerals. Explanation thereof will be partly omitted.

Specifically, the position detector 6 in FIG. 2 is provided with the incrementeal detecting circuit 7 in addition to the elements 2 to 4. The incremental detecting circuit 7 is so arranged as to sequentially output the detected pulse c in accordance with a rotor shaft revolution. Further, a gate circuit 8 and a counter 9 are connected in the rear stage of the code converting circuit 5. The gate circuit 8 is arranged such that it is opened or enabled upon supply of a set of instructions d output from numerical control NC apparatus, or the like, for controlling motors, or the like, when an electric power supply is turned on and the whole system becomes ready. The counter 9 is arranged to the initialized in accordance with the rotor synchronization data b from the code converting means 5, as an initial value, at the time the set of instructions d is generated. Also, the counter 9 is arranged to sequentially count the detected pulse c from the incremental detecting circuit 7 and output the counted value. Further, the counter 9 is arranged such that when the counted value reaches a value calculated by dividing a total number of the detected pulse c generated during one revolution of the rotor shaft 3, that is, a total number of the detected pulses c generated during one absolute detecting cycle, by the number of pole pairs of the motor, it is set to a predetermined value "0", for instance, and thereafter resumes the counting operation. In other words, when the counted value reaches a value equal to a total number of the pulses c generated in one cycle of the magnetic pole position detection, the counter value is set to a predetermined value, e.g., "0". For example, if the position detector 6 outputs the absolute codes "0" to "29" for one revolution of the rotor shaft and the motor has six poles is employed in the same manner as the first embodiment, a total number of pulses c generated for one revolution of the rotor is calculated to be 30. Since ⅓ revolution of the rotor corresponds to one cycle of the magnetic pole position detector, the counter 9 may be a decimal counter that counts from "0" to "9" and is reset to the counted value to "0" when it reaches "9". The next detected pulse c is then generated. Further, if a detector which outputs 2000 detected pulses c per one revolution of the rotor shaft 3 and a motor having eight poles are employed, the counter 9 may be one that counts 500 (2000/4) times and is reset to "0" when the counted value reaches "499" before the next detected pulse c is generated.

Now, will be described the operation of the second embodiment. When the power supply is turned on and the set instruction d is activated by the controller, an output representative of an absolute position of the rotor shaft 3 from the absolute detecting circuit 4 (arranged in the position detector 6) is converted by the code converting means 5 into an absolute position in one cycle of the magnetic pole position detection, that is, data representative of a magnetic pole position, which in turn is set in the counter 9 as an initial value through the gate circuit 8. Then, the detecting pulse c sequentially outputted from the incremental detecting circuit 7 each rotation of the motor is input and counted by the counter 9, so that the counted value which indicates a magnetic pole position is output from the counter 9 as rotor synchronization data. On the other hand, the absolute data a is outputted from the absolute detecting circuit 4, so that an absolute position of the rotor shaft 3 can also be detected by the absolute data a. The detected pulse c from the incremental detecting circuit 7 can also be used as an incremental signal indicating a travelling amount of the rotor shaft.

As described above, the embodiment shown in FIG. 2 is arranged succh that the magnetic pole position at the time the power supply is turned on is set in the counter 9 and thereafter the counter 9 counts the detected pulse c to obtain the rotor synchronization data b. Therefore, even when a detecting error is produced inthe absolute detecting circuit 4 due to high speed revolution of the motor, an error will never be produced in the rotor synchronization data by, thereby obtaining exact data b for the rotor synchronization.

Incidentally, when a motor having a different number of rotor magnetic poles is used, it is only required to exchange the code converter means 5, i.e., the ROM, in accordance with the number of rotor magnetic poles for inthe case of the first embodiment, and to exchange the code converting means 5 and the counter 9 in the case of the second embodiment. Accordingly, the position detectors 1 and 6 do not have to be exchanged.

I claim:

1. A rotor rotational position detector for a motor, comprising:

an absolute type position detector, coupled to a rotor shaft of the motor, for detecting an absolute position of the rotor shaft during one revolution of the rotor shaft, and for outputting a first coded signal indicative of the detected position, individual first coded signals being indicative of the associated detected positions respectively, and having values different from each other; and a code converting means, coupled to said absolute type position detection, for converting the first coded signal from said absolute type position detector into a second coded signal indicative of a rotor magnetic pole position in each drive control cycle of the motor, and for outputting the same, a number of motor drive control cycles, determined in accordance with a pole number of the motor, corresponding to one revolution of said rotor shaft.

2. A rotor rotational position detector for a motor as claimed in claim 1, wherein the motor is an AC servo motor.

3. A rotor rotational position detector for a motor as claimed in claim 1, wherein the motor is a stepping motor.

4. A rotor rotational position detector for a motor, comprising:

a position detector, coupled to a rotor shaft of the motor, for outputting a first coded signal representative of an absolute position of the rotor shaft during one revolution of the rotor shaft, and for sequentially outputting increment pulses with each revolution of the rotor shaft;

code converting means, coupled to said position detector, for converting the first coded signal from said position detector into a second coded signal representative of a rotor magnetic pole position for controlling the motor drive, and for outputting the second coded signal; and a counter, coupled between said position detector and said code converting means, reset to a predetermined value every time said counter counts pulses equal in number to the increment pulses generated during one cycle of the magnetic pole position detection, the number of the increment pulses being determined in dependence on the number of rotor poles of the motor, an output from said code converting means being input to said counter as an initial value when a power supply is turned on, said counter being operable to count the increment pulses from said position detector and outputting the counted value as a third coded signal representative of a rotor magnetic pole position for controlling the motor drive.

5. A rotor rotational position detector for a motor as claimed in claim 4, wherein the motor is an AC servo motor.

6. A rotor rotational position detector for a motor as claimed in claim 4, wherein the motor is a stepping motor.

7. A rotor rotational position detector for a motor including another shaft, comprising:
- a position detector, coupled to the rotor shaft of the motor, comprising:
  - detecting means for outputting a first coded signal representative of an absolute position of the rotor shaft during one revolution of the other shaft; and
  - incremental detecting means, coupled to said detecting means, for outputting increment pulses in accordance with each revolution of the rotor shaft;
- code converting means, coupled to said detecting means, for receiving the first coded signal and converting the first coded signal into a second coded signal representative of a rotor magnetic pole position for controlling motor drive and outputting the second coded signal;
- gate circuit means, coupled to said code converting means, for receiving the second coded signal and instruction data and outputting a signal; and
- converter means, coupled between said gate circuit means and said incremental detecting means, for receiving the increment pulses from said incremental detecting means and the output signal from said gate circuit means and for converting the increment pulses and outputting a third coded signal representative of a rotor magnetic pole position for controlling motor drive.

8. A rotor rotational position detector according to claim 7, wherein said converting means is reset to a predetermined value every time the number of control pulses is equal to the increment pulses generated during one cycle of a magnetic pole position detection.

9. A rotor rotational position detector according to claim 7, wherein the motor is an AC servomotor.

10. A rotor rotational position detector according to claim 7, wherein the motor is a stepping motor.

11. A rotor rotational position detector according to claim 7, wherein the instruction data is provided by a numerical control unit.

* * * * *

UNITED STATES PATENT AND TRADEMARK OFFICE
CERTIFICATE OF CORRECTION

PATENT NO. : 4,827,203

DATED : MAY 2, 1989

INVENTOR(S) : TETSURO SAKANO

It is certified that error appears in the above-identified patent and that said Letters Patent is hereby corrected as shown below:

Col. 2, line 5, delete "of";
line 12, "shaft" should be --shaft,--;
line 18, after "is" insert --also--;

line 26, after "and" insert --to--.

Col. 3, line 8, "As" should be --An--;
line 68, "selected," should be --selected--.

Col. 4, line 54, delete "same";
line 55, "the elements" should be --the same elements--;
line 67, after "from" insert --a--.

Col. 5, line 2, "the" should be --be--;
line 23, "after "poles" insert --and--;
line 49, after "7" insert --with--;
line 60, "succh" should be --such--;
line 65, "inthe" should be --in the--;
line 67, "by," should be --b,--.

UNITED STATES PATENT AND TRADEMARK OFFICE
CERTIFICATE OF CORRECTION

PATENT NO. : 4,827,203

DATED : MAY 2, 1989

INVENTOR(S) : TETSURO SAKANO

It is certified that error appears in the above-identified patent and that said Letters Patent is hereby corrected as shown below:

Col. 6, line 3, "converter" should be --converting--;
line 4, "delete "for";
line 5, "inthe" should be --in the--.

Signed and Sealed this

Twenty-third Day of January, 1990

*Attest:*

JEFFREY M. SAMUELS

*Attesting Officer*     *Acting Commissioner of Patents and Trademarks*